United States Patent
Mally

(10) Patent No.: US 7,581,688 B2
(45) Date of Patent: Sep. 1, 2009

(54) BLENDER WITH CRUSHED ICE FUNCTIONALITY

(75) Inventor: Kenneth P. Mally, Grand Rapids, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 191 days.

(21) Appl. No.: 11/684,901

(22) Filed: Mar. 12, 2007

(65) Prior Publication Data

US 2008/0223963 A1    Sep. 18, 2008

(51) Int. Cl.
    *B02C 25/00*    (2006.01)
(52) U.S. Cl. ............. 241/30; 241/36; 241/DIG. 17
(58) Field of Classification Search ........... 366/206, 366/601; 241/36, 30, 282.1, 282.2, 92, DIG. 17
    See application file for complete search history.

(56) References Cited

U.S. PATENT DOCUMENTS

| | | | |
|---|---|---|---|
| 4,541,573 A | 9/1985 | Fujiwara et al. | |
| 4,838,702 A | 6/1989 | Torimitsu et al. | |
| 5,347,205 A | 9/1994 | Piland | |
| 5,380,086 A | 1/1995 | Dickson | |
| 5,556,198 A | 9/1996 | Dickson, Jr. et al. | |
| 5,655,834 A | 8/1997 | Dickson | |
| 6,092,922 A | 7/2000 | Kett et al. | |
| 6,397,735 B1 | 6/2002 | Wong | |
| 6,402,365 B1 | 6/2002 | Wong | |
| 6,609,821 B2 | 8/2003 | Wulf et al. | |
| 6,758,592 B2 | 7/2004 | Wulf et al. | |
| 6,807,463 B1 | 10/2004 | Cunningham et al. | |
| 2002/0009017 A1 | 1/2002 | Kolar et al. | |
| 2003/0133235 A1 | 7/2003 | Yung et al. | |
| 2005/0068846 A1 | 3/2005 | Wulf et al. | |
| 2006/0086843 A1 | 4/2006 | Lin et al. | |
| 2006/0202070 A1* | 9/2006 | Bohannon et al. | 241/34 |
| 2006/0203610 A1* | 9/2006 | Bohannon et al. | 366/206 |

FOREIGN PATENT DOCUMENTS

GB    2424081 A1    9/2006

* cited by examiner

*Primary Examiner*—Mark Rosenbaum
(74) *Attorney, Agent, or Firm*—Tara M. Hartman; McGarry Bair P.C.

(57) ABSTRACT

Processing food items in a blender by operating the cutter assembly at a predetermined operating speed, reducing the operating speed of the cutter assembly t, and accelerating the operating speed of the cutter assembly in response to the items in the container having settled around the cutter assembly until the food items are suspended above the cutter assembly.

16 Claims, 5 Drawing Sheets

BLENDER WITH CRUSHED ICE FUNCTIONALITY

BACKGROUND OF THE INVENTION

1. Field of the Invention

The invention relates generally to household blenders, and more particularly to a household blender having a crushed ice functionality.

2. Description of the Related Art

Culinary blenders are ubiquitous in a conventional commercial or household kitchen. Such appliances typically comprise a selectively closable, open-top reservoir or container having a multiple-bladed cutter assembly at a lower portion of the reservoir which is rotated about a vertical axis by a motor driven shaft extending through the bottom of the reservoir. The blades are typically configured to both pulverize and mix the contents in the reservoir, and are used to process solid and semi-solid food items, liquids, and mixtures of solid and liquid food items. Mixing is most efficiently achieved by a pattern of movement that introduces the entire contents of the reservoir into contact with the rotating blades during the mixing operation.

Conventional countertop blenders frequently include a functionality for processing crushed ice from ice cubes for beverages, deserts, confections, and the like. This functionality typically comprises a timed pulsing pattern, which is initiated by the operator actuating a dedicated ice crushing function switch. The pulsing pattern is typically achieved by cycling the operation of the blender between a preselected duration of "on" time and a preselected duration of "off" time according to a preprogrammed sequence of pulsations. For example, the "on" time may be 0.1 second followed by an "off" time of 0.2 second, which is repeated until the blender is stopped by the operator again actuating the crushed ice function switch.

This preprogrammed "on-off" sequence enables hands-free operation of the blender, but the constant, regular pulsing pattern is not efficient, nor does it always result in properly crushed ice. This is due to the high variation in the properties and quantities of the contents in the reservoir, as well as the changing consistency of the contents during the blending process. If the constant pulsing pattern is too slow, the contents may settle relatively quickly, resulting in excessive "off" time between "on" pulses. This can lead to a total processing time longer than necessary. If the constant pulsing pattern is too fast, the contents will not be allowed to completely settle to the bottom of the reservoir, and the blending performance will consequently be poor because the blades will be unable to efficiently process and mix the contents. These conditions can also leave the ice over crushed or under crushed.

There is a need for a blender having a crushed ice functionality which can accommodate variations in the properties and quantities of the contents in order to optimize the processing and mixing of the contents.

SUMMARY OF THE INVENTION

An embodiment of the invention comprises a blender comprises a motor, a container for holding items for processing, and a cutter assembly located within the container and operably coupled to the motor whereby the motor effects the movement of the cutter assembly. A cycle of operation for the blender comprises operating the cutter assembly at a predetermined operating speed, reducing the operating speed of the cutter assembly, and accelerating the operating speed of the cutter assembly in response to the items in the container having settled around the cutter assembly.

An alternate embodiment of the invention comprises a blender comprising a base, a motor located within the base, a container coupled to the base and adapted to hold items for processing, a cutter assembly located within the container and operably coupled to the motor, a speed sensor outputting a signal representative of the motor speed, and a controller operably coupled to the motor and the speed sensor for controlling the speed of the motor in response to the output signal of the speed sensor to implement a cycle of operation. The cycle of operation comprises the sequence of operating the cutter assembly at a predetermined operating speed, reducing the operating speed of the cutter assembly, and accelerating the operating speed of the cutter assembly in response to the items in the container having settled around the cutter assembly.

An alternate embodiment of the invention comprises a blender comprising a motor, a container for holding items for processing, and a cutter assembly located within the container and operably coupled to the motor whereby the motor effects the movement of the cutter assembly. A method of processing food items in a blender comprises operating the cutter assembly at a predetermined operating speed until at least some of the food items are suspended above the cutter assembly, reducing the operating speed of the cutter assembly to allow at least some of food items to settle around the cutter assembly, and accelerating the operating speed of the cutter assembly in response to the items in the container having settled around the cutter assembly until the food items are suspended above the cutter assembly.

DESCRIPTION OF AN EMBODIMENT OF THE INVENTION

Figure 1:
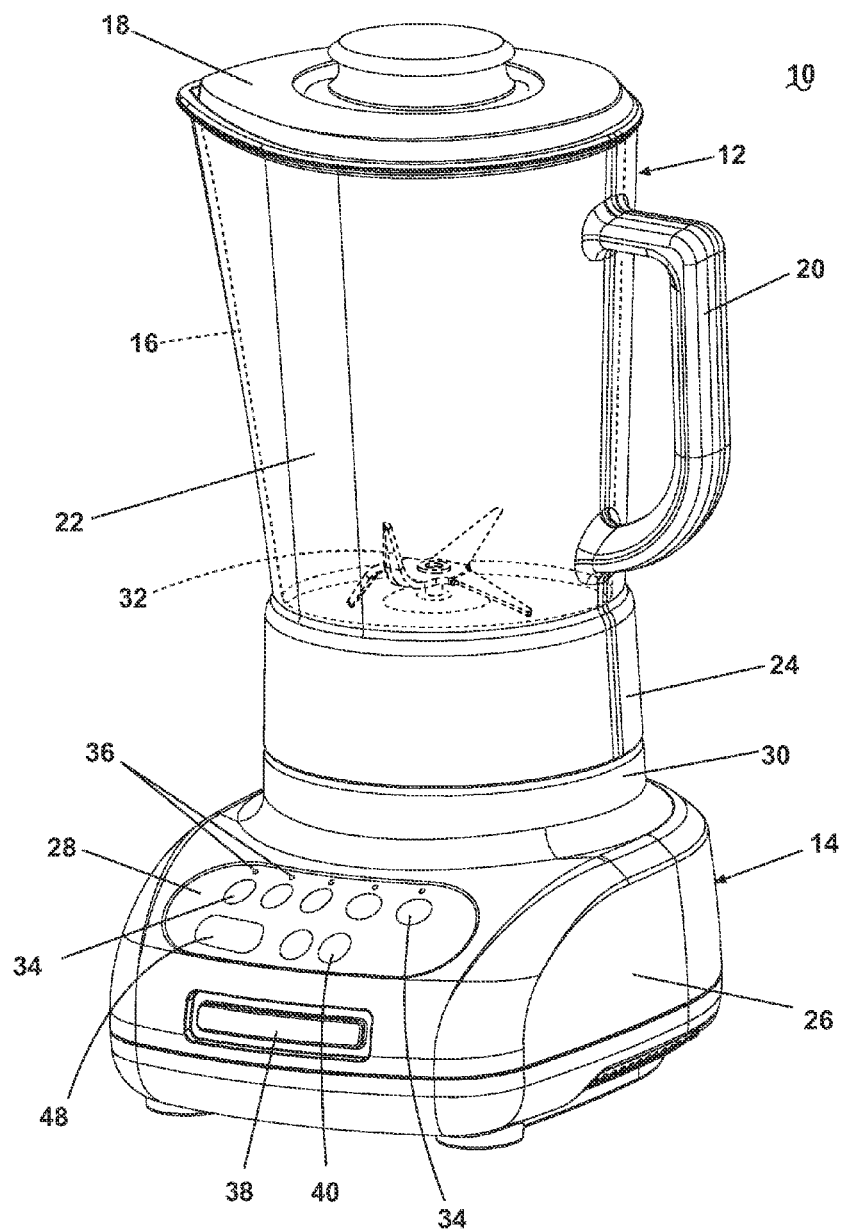
FIG. 1 is a perspective view of an embodiment of a blender according to the invention comprising a container and a motor-driven cutter assembly for processing food items.

Referring now to FIG. 1, an embodiment of the invention is illustrated comprising a blender 10. The blender 10 has standard elements common in the art, as disclosed in U.S. Pat. No. 6,092,922, which is incorporated fully herein by reference. These common elements will not be described in detail except as necessary for a full understanding of the invention.

The blender 10 comprises an open-top container 12 and a base 14. The container 12 comprises an upwardly-extending perimeter wall 22 from which extends a handle 20 to assist a user in maneuvering the container 12 during use. A lid 18 closes the top of the container 12. The perimeter wall 22 transitions to a downwardly-extending annular skirt 24. Separating the perimeter wall 22 and the annular skirt 24 is a bottom wall (not shown) generally orthogonal to the axis of the perimeter wall 22 and the annular skirt 24

Figure 3:
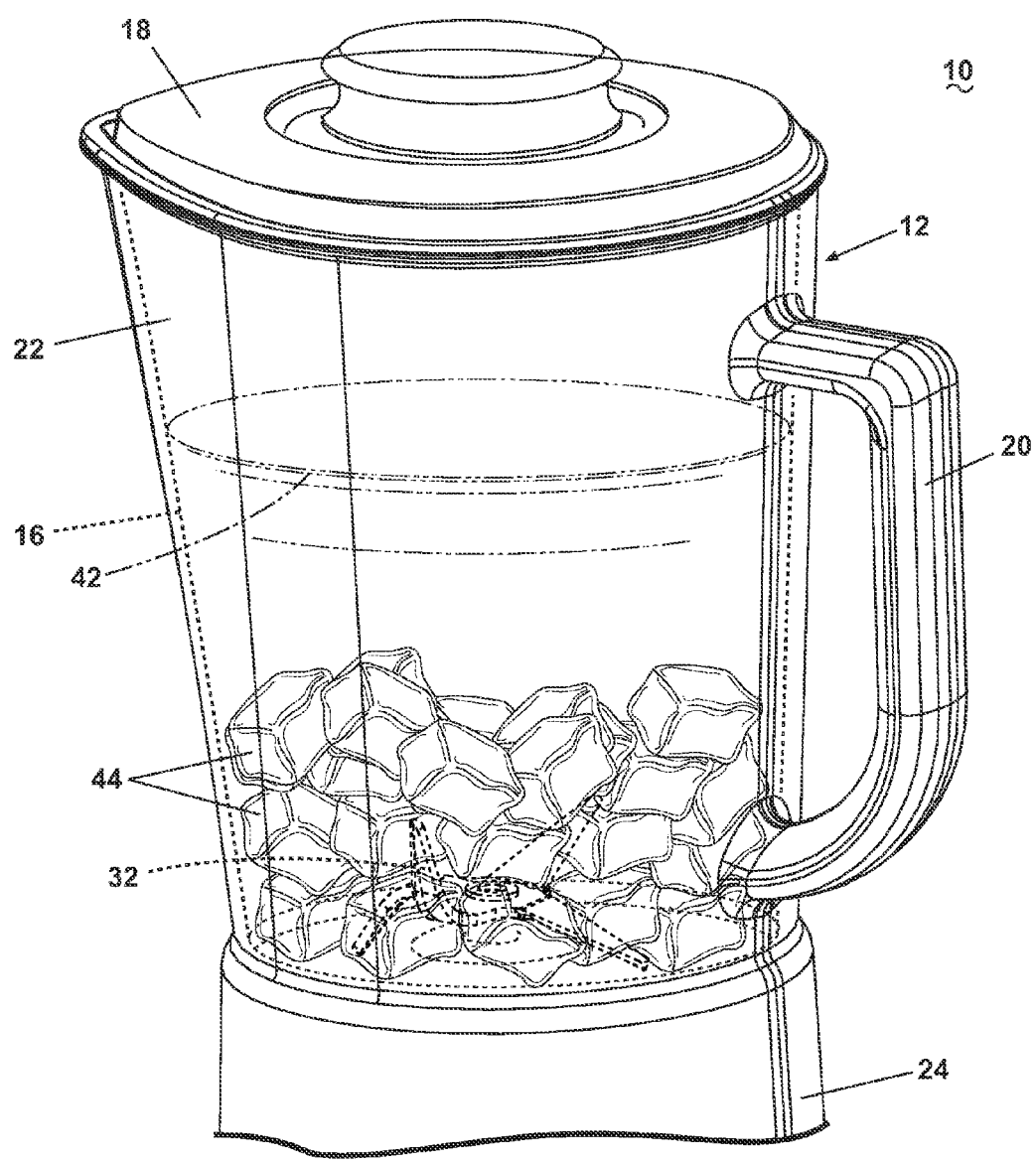
FIG. 3 is a perspective partial view of the blender illustrated in FIG. 1 showing food items in a settled condition in the container.

The container 12 defines a chamber 16 adapted to hold a food item (FIG. 3). A food processing assembly, e.g. a rotating cutter assembly 32, for processing food items in the chamber 16 is mounted in an aperture in a bottom wall of the container 12 so that a first blade portion of the cutter assembly 32 extends into the chamber 16 and a second drive shaft portion of the cutter assembly 32 extends through the bottom wall of the container 12 into the interior of the annular skirt 24. The cutter assembly 32 comprises a plurality of mixing blades to facilitate mixing, liquefying, chopping, processing, etc., of food items as the cutter assembly 32 rotates. The drive shaft portion is rotatably mounted in the bottom wall of the container 12 and is adapted for coupling with an output shaft of a drive motor (not shown) housed in the base 14.

The base 14 comprises a base housing 26 having a control panel 28. The base housing 26 transitions upwardly to a container pedestal 30 adapted for cooperative registry with the skirt 24 when the container 12 is seated on the base 14. A motor 54 (FIG. 2) is located within the base housing 26. The motor 54 is operably coupled to the cutter assembly 32 for driving the cutter assembly 32. This can be accomplished by the motor 54 having an output shaft that is coupled to the cutter assembly 32. Seating of the container 12 on the container pedestal 30 will couple the output shaft of the drive motor 54 with the drive shaft portion of the cutter assembly 32.

The control panel 28 can comprise an array of switches 34, lights 36, and a display panel 38 to enable a user to select an operational parameter, such as an "on" and "off" switch 48, speed, or time, select a processing function, such as chopping, liquefying, or crushing, and/or monitor a parameter, such as a selected function, time, or speed. The control panel 28 can also comprise a switch 40 for selecting an ice crushing function according to the invention, as described more fully hereinafter.

The switches 34, 40, 48 can comprise toggle switches, push-button switches, membrane or tactile switches, and the like. The lights 36 can comprise incandescent bulbs, LEDs, and the like.

Figure 2:
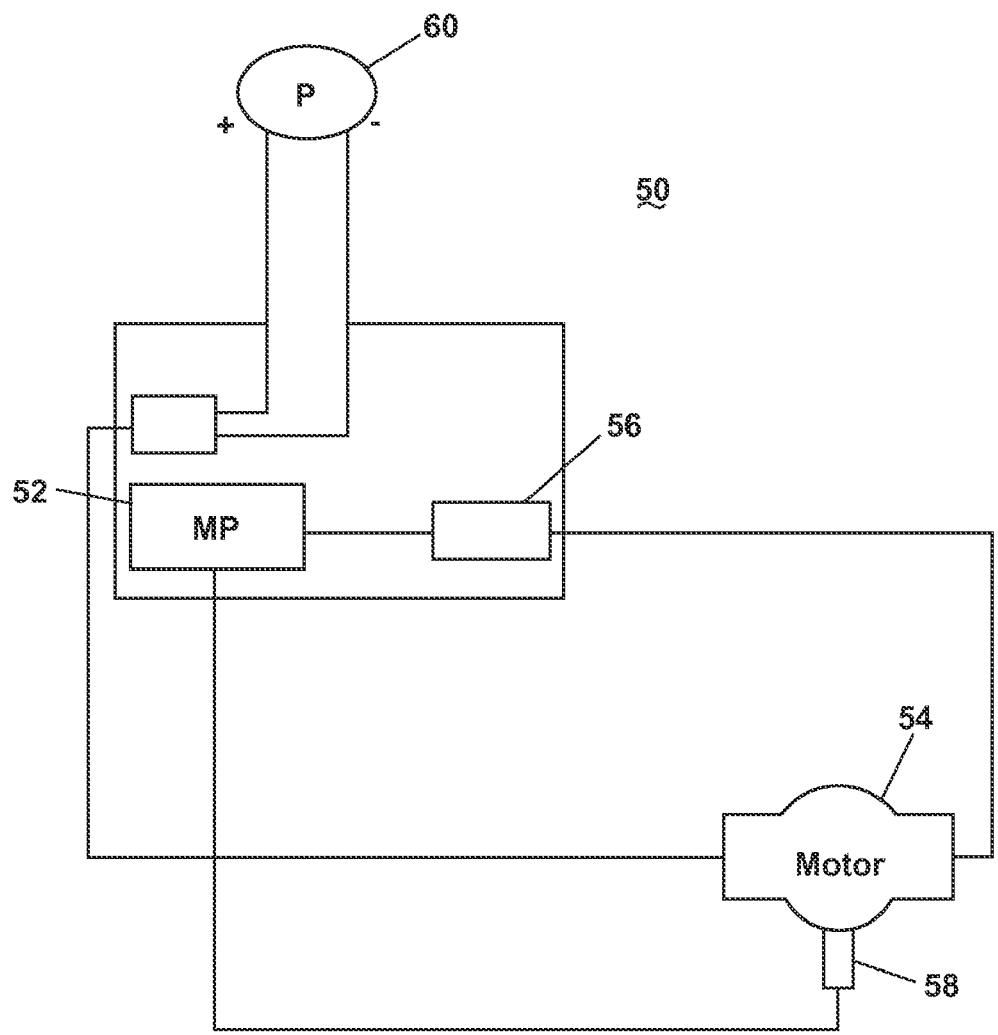
FIG. 2 is a schematic view of a control system for the blender illustrated in FIG. 1.

FIG. 2 illustrates in schematic form a control system 50 for the ice crushing function. The control system comprises a microprocessor 52 operably coupled with a well-known triac switch 56 for controlling the "on" and "off" states of the motor 54. The motor 54 is supplied with power from a suitable power supply 60. The speed of the motor 54 is monitored through a suitable, well-known sensor, such as a Hall effect sensor coupled with the motor 54 for determining the motor shaft speed in RPM. Alternatively, the speed of the motor 54 can be monitored through a well-known current sensor coupled with the motor power input, an optical sensor coupled with the motor shaft, or some other motor performance feedback device.

The processor 52 is adapted with a preprogrammed cycle for controlling the motor 54 through the triac switch 56 to provide a pulsed "on/off" operation of the motor 54, as hereinafter described.

FIG. 3 illustrates the condition of the contents of the container 12 when the motor 54 is in the "off" state. For illustrative purposes, the contents are assumed to comprise a liquid fraction 42 and solid particles 44, such as ice cubes. In the "off" state, the solid particles 44 will accumulate at the bottom of the chamber 16 around the cutter assembly 32 into a "settled" condition. Thus, when the motor 54 is triggered into the "on" state, the comminuting effect of the cutter assembly 32 on the solid particles 44 will be optimized.

Figure 4:
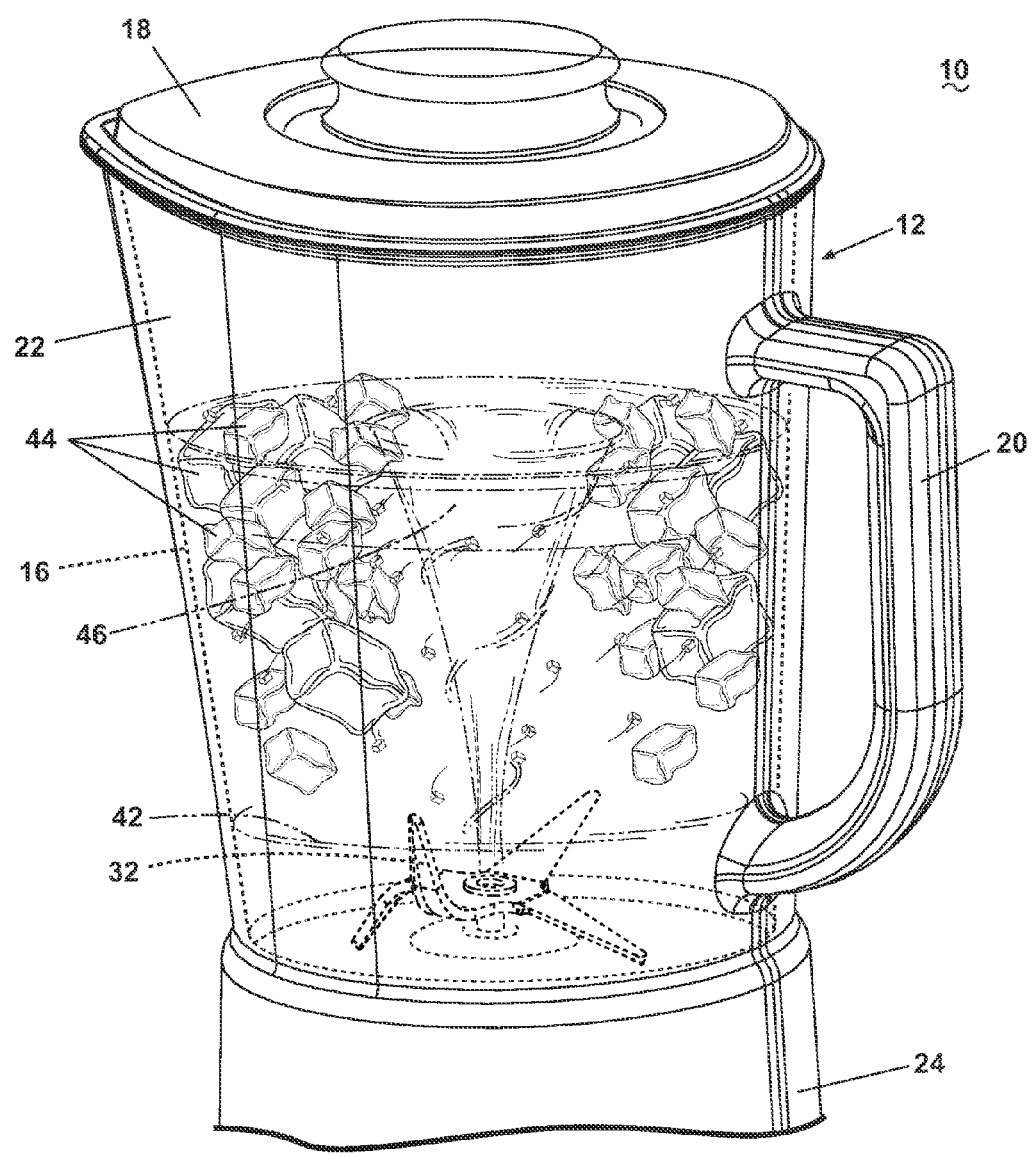
FIG. 4 is a perspective partial view of the blender illustrated in FIG. 1 showing food items in a suspended condition in the container.

FIG. 4 illustrates the condition of the contents of the container 12 when the motor 54 is in the "on" state, i.e. during a predetermined operating time period. In this condition, the solid particles 44 are suspended in the liquid fraction 42, which is characterized by a vortex 46 caused by the spinning of the cutter assembly 32. The vortex 46 causes the solid particles 44 to migrate away from the cutter assembly 32 and, depending in part on the relative proportion of the liquid fraction 42, to be urged against the perimeter wall 22, in a "suspended" condition. At some time after the initiation of the "on" state, the solid particles 44 will have migrated away from the cutter assembly 32, which will no longer comminute the solid particles 44. This time is equivalent to the predetermined operating time period.

Figure 5:
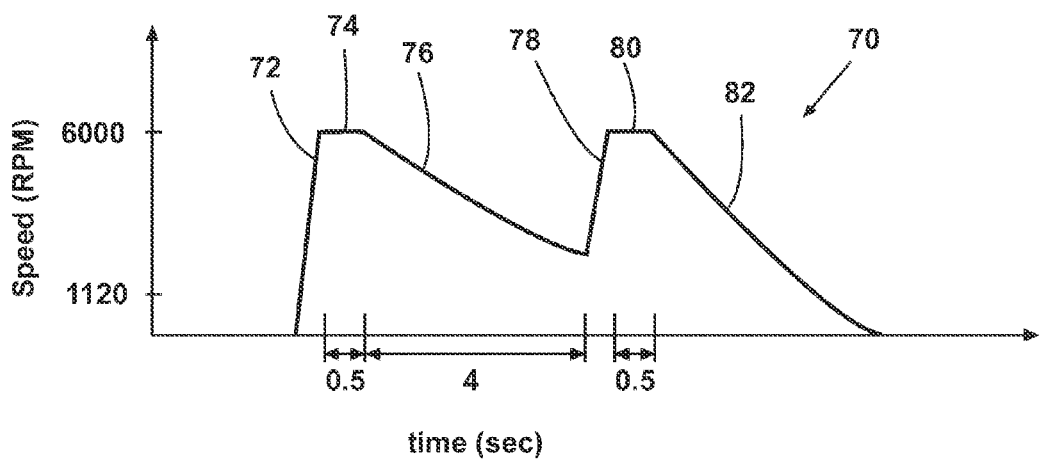
FIG. 5 is a graphical representation of the speed of the motor for a no-load condition of food items in the container.

FIG. 5 illustrates a no-load curve 70 for this process in which there are no contents in the container 12, or a relatively small quantity and/or loose consistency of the contents. For illustrative purposes in FIGS. 5 and 6, 6000 RPM represents a predetermined operating speed, and 1120 RPM represents a speed at which solid particles have accumulated into the "settled" condition, i.e. a predetermined settling speed. 0.5 second represents the predetermined operating time period, and 4 seconds represents a predetermined deceleration time period during which solid particles have accumulated into the "settled" condition.

Upon the operation of the crush ice switch 40, the motor 54 will be accelerated 72 from the "off" state to the predetermined operating speed, such as 6000 RPM, and maintained at this speed for the predetermined operating time period, such as 0.5 second 74. Upon the expiration of the predetermined operating time period, power to the motor 54 will be terminated by the triac switch 56 under the control of the processor 52 to deactivate the motor 54 to the "off" state, and the motor 54 will be allowed to decelerate 76 toward the predetermined settling speed, such as 1120 RPM. Since the rotation of the cutter assembly 32 will be relatively unimpeded by the contents of the container 12, the motor speed may not reach the predetermined settling speed within the predetermined deceleration time period of 4 seconds. Upon the expiration of the predetermined deceleration time period, the triac switch 56 will deliver power to return the motor 54 to the "on" state, the motor 54 will re-accelerate 78 to the predetermined operating speed, and will be maintained at this speed 80 for the predetermined operating time period. Upon the expiration of the predetermined operating time period, the motor 54 will again be returned to the "off" state by the triac switch 56 under the control of the processor 52, and allowed to decelerate 82 toward the predetermined settling speed, or, if the crush ice switch 40 has been actuated, toward a speed of 0 RPM. The "on/off" sequence is repeated until the user activates the crush ice switch 40 or the on/off switch 48 to terminate the operation.

At some point in the process, deceleration of the motor to the predetermined settling speed may occur prior to the expiration of the predetermined deceleration time period, as described above. In such a case, power will be restored to the motor 54 upon the motor reaching the predetermined settling speed, and the motor 54 will again accelerate to the predetermined operating speed, to repeat the "on/off" process. This condition is illustrated in FIG. 6.

Figure 6:
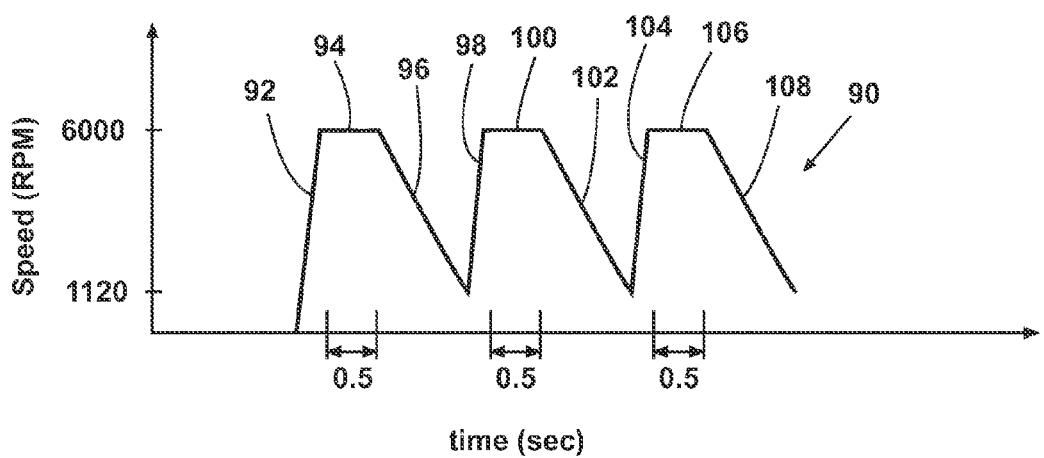
FIG. 6 is a graphical representation of the speed of the motor for a loading condition of food items in the container.

FIG. 6 illustrates a load curve at 90 for the process in which the contents of the container 12 are of a consistency that enables the motor RPM to decelerate to a speed of 1120 RPM in less than 4 seconds after termination of power to the motor 54. Thus, upon the operation of the crush ice switch 40, the motor 54 will be accelerated 92 from the "off" state to a predetermined operating speed of 6000 RPM, and maintained at this speed for a predetermined operating time period of 0.5 second 94. Upon the expiration of the predetermined 0.5 second, the motor 54 will be deactivated to the "off" state, and allowed to decelerate 96 toward the predetermined settling speed of 1120 RPM. Since the rotation of the cutter assembly 32 will be relatively impeded by the contents of the container 12, the motor speed will rotate at a speed in excess of 1120 RPM after 4 seconds has expired. Upon reaching 1120 RPM, the motor 54 will be returned to the "on" state, will re-accelerate 98 to 6000 RPM, and will be maintained at this speed 100 for 0.5 second. Again, upon the expiration of 0.5 second, the motor 54 will be deactivated to the "off" state, and allowed to decelerate 102 toward 1120 RPM. The process of acceleration 104, maintenance of the 6000 RPM speed 106, and deceleration 108 toward the 1120 RPM speed will be maintained until the crush ice switch 40 or the on/off switch 48 is actuated to terminate the process.

The predetermined operating speed, predetermined settling speed, predetermined operating time period, and predetermined deceleration time period are functions of the blender motor size, the cutter assembly configuration, the container size and configuration, the properties such as hardness and viscosity of the items to be processed in the blender, and the like, and are selected to optimize the effectiveness of the pulsing process. Thus, these speeds and time periods will vary for different blenders, and must be determined empirically for a particular blender. The description following will be based upon a blender having a predetermined operating speed of 6000 RPM, a predetermined settling speed of 1120 RPM, a predetermined operating time period of 0.5 seconds, and a predetermined deceleration time period of 4 seconds.

When the motor 54 is returned to the "off" state, the solid particles 44 will migrate to the bottom of the chamber 16, to accumulate around the cutter assembly 32 in the "settled" condition. The maximum time period for this migration of solid particles 44 into the "settled" condition is equivalent to the predetermined deceleration time period. However, depending on the properties of the solid particles 44, the cutter assembly 32, the motor 54, the container 12, and other properties of the blender 10, the settled condition may be reached prior to the expiration of the predetermined deceleration time period, as indicated by the slowing of the motor 54 to the predetermined settling speed. In either case, the motor 54 will be triggered into the "on" state when the solid particles 44 are in the "settled" condition, thereby optimizing the comminuting effect of the cutter assembly 32 on the solid particles 44.

The feedback sensor can indicate in a well-known manner whether one of two conditions has occurred, i.e. whether the motor speed has dropped below 1120 RPM, or whether voltage to the motor has been removed for 4 consecutive seconds.

As ingredients (such as ice) settle within the chamber 16, the load on the cutter assembly 32 will cause the motor speed to drop-off relatively rapidly. The feedback sensor 58 will sense this drop off, and will generate a proportional signal to the processor 52, which will cause triac switch 56 to apply voltage to the motor 54 for repeating the cycle. As ingredients in the chamber 16 are comminuted and mixed, the load on the cutter assembly will drop and will trend back to the no-load condition. To end the cycling, the consumer can either switch the blender to the 'off' state, or actuate a speed switch, at which time the blender will exit the "crush ice" function to operate at the selected speed.

The "on" time, the "on" speed, and the RPM threshold have been selected in order to optimize crush ice performance and simulate a person crushing ice by cycling a pulse button. It has been found that a user will typically hold the pulse button only for a short period of time (e.g. 0.5 sec) and at a speed that will crush ice (i.e. 6000 RPM). The user will then release the pulse switch to allow the ingredients to settle back down to the bottom of the chamber 16 to start the process over.

Rather than a fixed period of time between "on" pulses, the "off" time is variable, and based on the contents of the blender. The heavier the load, the quicker the contents will settle, the quicker the cutters will slow down, and the quicker the contents will be ready to be processed again.

The motor 54 and cutter assembly 32 speed does not return all the way to 0 RPM before repeating the process, in part, because the additional time to reach 0 RPM and reaccelerate from 0 RPM to the preselected operating speed does not improve comminuting performance and only slows the entire process. 1120 RPM represents for a particular blender configuration a cutter assembly speed that slows significantly enough to allow the contents to reach the "settled" condition to be processed again.

The 0.5 sec predetermined operating time period and the 6000 RPM predetermined operating speed represent an optimization of the pulsing feature. During a pulsing operation, the crushing of ice, or any other ingredients, is primarily effective only during the beginning of the cycle. After the initial acceleration of the cutter assembly, the ingredients are tossed away from the cutter assembly and are no longer effectively comminuted and blended. 0.5 second represents a time period during which the comminuting action of the cutter assembly is optimized.

The predetermined operating speed has a similar effect. If the speed is too high, the contents are thrown away from the cutter assembly too quickly, resulting in poor comminuting and blending performance. If the speed is too low, insufficient work is performed on the contents, also resulting in poor comminuting and blending performance. 6000 RPM represents a predetermined operating speed for which the comminuting action of the cutter assembly is optimized.

The blender described herein provides a variable cycling of a crush ice pulsing pattern, which is different than the repeating time-based pulsing pattern of conventional blenders. The variable pulsing process better simulates how a user manually achieves the comminuting and blending effect when operating the on/off switch on a blender. If a user is crushing ice cubes or other solid food items by cycling a conventional pulse switch or on/off switch, they will rely on visual feedback from observing the blending operation to adjust their operation pattern. A user manually operating the pulse or on/off switch will observe the ingredients and, after sending a quick pulse to comminute the ingredients, will observe the ingredients settle back down around the cutter assembly, indicating the need for the next quick pulse. As the ingredients become processed the pulsing pattern will quicken, with shorter "off" times between the quick pulses. With the use of speed feedback between the motor/cutter assembly and the blender control system the blender can "sense" when the cutter assembly is slowing down, an indication that the ingredients are settling. Once a predetermined degree of settling has been reached, as indicated by the rotation speed of the motor/cutter assembly, the preprogrammed routine can control the next pulse burst to the motor. The speed and duration of the "on" time can be optimized for the intended blender based on container design, capacity, motor power, and cutter assembly configuration.

While the invention has been specifically described in connection with certain specific embodiments thereof, it is to be understood that this is by way of illustration and not of limitation. Reasonable variation and modification are possible within the scope of the forgoing disclosure and drawings without departing from the spirit of the invention which is defined in the appended claims.

What is claimed is:

1. A cycle of operation for a blender comprising a motor, a container for holding items for processing, and a cutter assembly located within the container and operably coupled to the motor whereby the motor effects the rotation of the cutter assembly, the cycle comprising:

automatically controlling a rotational speed of the cutter assembly to effect a pulsing of the speed of the cutter assembly wherein each pulse comprises:

(A) a constant speed phase, where the operating speed of the cutter assembly is maintained at a predetermined operating speed, (B) a deceleration phase, where the speed of the cutter assembly is reduced from the operating speed to a predetermined settling speed indicative of the items in the container having settled around the cutter assembly, which is less than the operating speed and greater than zero, and (C) an acceleration phase, where the speed of the cutter assembly is increased from the settling speed to the operating speed.

2. The cycle according to claim 1, wherein steps A, B, and C are sequentially repeated until at least one of the cycle automatically ending and the user manually ending the cycle.

3. The cycle according to claim 1, wherein step A comprises maintaining the predetermined operating speed for a predetermined operating time period.

4. The cycle according to claim 3, wherein the predetermined operating speed is selected to comminute the items.

5. The cycle according to claim 4, wherein the predetermined operating time period is selected to maintain contact of the cutter assembly with the items during operation of the cutter assembly at the predetermined operating speed.

6. The cycle according to claim 1, wherein step B comprises continuously reducing the operating speed of the cutter assembly.

7. The cycle according to claim 1, wherein step B comprises terminating power to the motor to reduce the operating speed of the cutter assembly.

8. The cycle according to claim 7, wherein reducing the operating speed of the cutter assembly allows the items in the container to settle around the cutter assembly.

9. A method of processing food items in a blender, the blender comprising a motor, a container for holding items for processing, and a cutter assembly located within the container and operably coupled to the motor whereby the motor effects the movement of the cutter assembly, the method comprising:

automatically controlling a rotational speed of the cutter assembly to effect a pulsing of the speed of the cutter assembly wherein each pulse comprises:

(A) operating the cutter assembly in a constant speed phase, where the operating speed of the cutter assembly is maintained at a predetermined operating speed until at least some of the food items are suspended above the cutter assembly;

(B) reducing the operating speed of the cutter assembly during a deceleration phase, where the speed of the cutter assembly is reduced from the operating speed to a predetermined settling speed to allow at least some of the food items to settle around the cutter assembly, wherein the settling speed is less than the operating speed and greater than zero; and (C) accelerating the operating speed of the cutter assembly during acceleration phase, where the speed of the cutter assembly is increased from the settling speed to the operating speed until the food items are suspended above the cutter assembly.

10. The method according to claim 9, wherein steps A, B, and C are sequentially repeated until at least one of the cycle automatically ending and the user manually ending the cycle.

11. The method according to claim 9, wherein step A comprises maintaining the predetermined operating speed for a predetermined operating time period.

12. The method according to claim 11, wherein the predetermined operating speed is selected to comminute the items.

13. The method according to claim 12, wherein the predetermined operating time period is selected to maintain contact of the cutter assembly with the items during operation of the cutter assembly at the predetermined operating speed.

14. The method according to claim 12, wherein the predetermined operating time period is selected to operate the cutter assembly until the food items are suspended above the cutter assembly.

15. The method according to claim 9, wherein step B comprises continuously reducing the operating speed of the cutter assembly.

16. The method according to claim 9, wherein step B comprises terminating power to the motor to reduce the operating speed of the cutter assembly.

* * * * *